H. S. STONE.
Blast-Regulator for Grain-Separator.

No. 199,594. Patented Jan. 22, 1878.

WITNESSES:
C. Clarence Poole
Geo. H. Evans

INVENTOR:
Henry S. Stone
per attys.
A. H. Evans & Co.

UNITED STATES PATENT OFFICE.

HENRY S. STONE, OF ORANGE, INDIANA.

IMPROVEMENT IN BLAST-REGULATORS FOR GRAIN-SEPARATORS.

Specification forming part of Letters Patent No. 199,594, dated January 22, 1878; application filed December 1, 1877.

*To all whom it may concern:*

Be it known that I, HENRY S. STONE, of Orange, Fayette county, and State of Indiana, have invented a new and useful Improvement in Grain-Thrashing Machines, of which the following is a clear, full, and exact description, reference being had to the accompanying drawings, making a part of this specification, in which—

Figure 1:
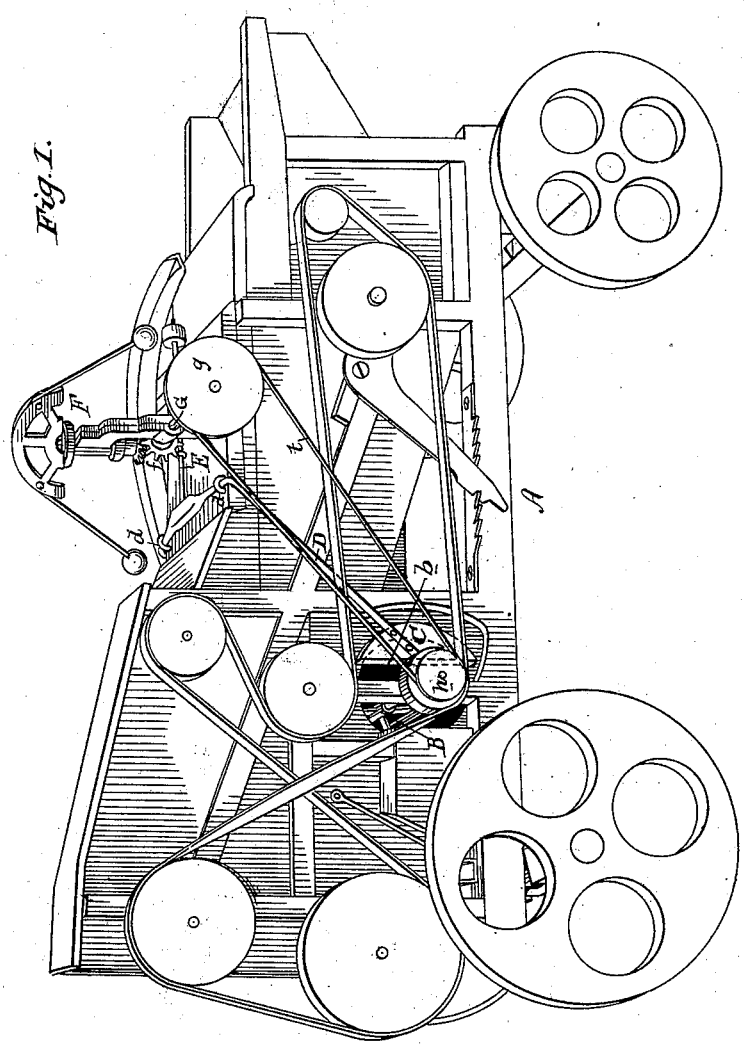
Figure 2:
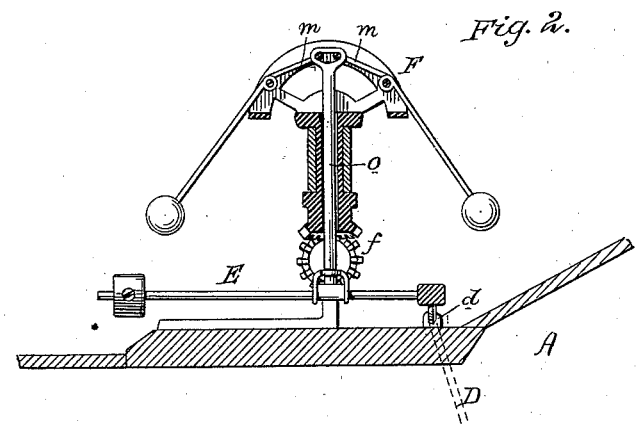
Figure 3:
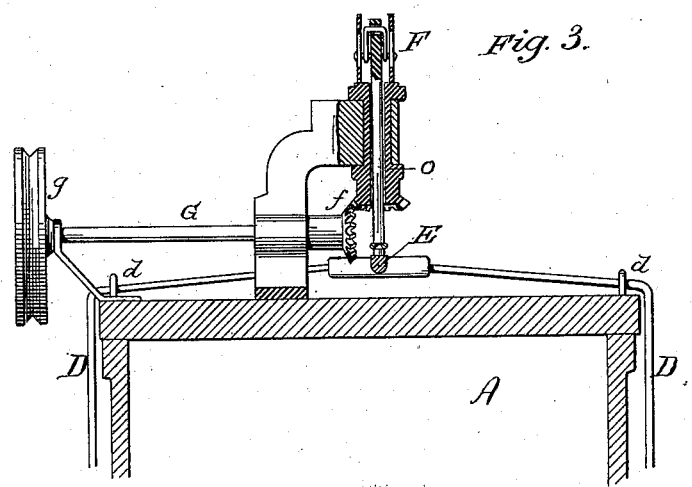

Figure 1 is a perspective view of a thrashing-machine with my improvements attached. Fig. 2 is a longitudinal vertical section; and Fig. 3 is a lateral vertical section.

The object of my invention is to regulate the draft to the speed of the fan—that is to say, when the machine is fed fast and its motion is retarded, to increase the draft sufficient to separate the chaff from the grain; and, when the feed is light, to shut off the draft and prevent the grain from being blown over the grain-board.

My invention consists in a governor of peculiar construction, to regulate the draft to the fan, and is equally applicable to a clover-huller or other similar machine.

To enable others skilled in the art to make and use my invention, I will proceed to describe the exact manner in which I have carried it out.

In the drawings, A represents an ordinary thrashing-machine with the fan-shaft B. The openings $b$ admit the air into the fan on each side of the machine, and these are opened or closed by means of the gates C, rigidly attached to the arms D of the balance-lever E on the top of the machine, the fulcrums of the said lever being at $d$, on the upper edge of each side of machine, as shown in Fig. 1. By raising or lowering the balance-lever E, the lower ends of the arms D rise or fall, and with them the gates C, thus closing or opening the air-passage $b$, as desired.

The balance-lever E is operated and regulated by means of the governor F, the arms of which are revolved by means of the cog-gear $f$, shaft G, and pulley $g$, connected by a band, $t$, with a pulley, $h$, on the outer end of the fan-shaft B, as shown in Fig. 1. As the governor is rapidly revolved, the arms are thrown out by the centrifugal force, and the inner ends $m\ m$ (see Fig. 2) act as levers to depress the vertical rod $o$, and force down the balance-lever, which raises the gates, and regulates and equalizes the admission of air to the fan. The more rapidly the machine is run the greater centrifugal power is exerted, and the greater the depression of the balance-lever and less the amount of air admitted to the fan. But should the feed be increased and the running speed of the machine be checked, the arms of the governor will gradually fall, the vertical rod $o$ will be proportionally raised, the balance-lever raised, the gates lowered, and a sufficient supply of air admitted to separate the chaff from the grain.

If an inexperienced person is feeding the machine, the admission of air to the fan is automatically regulated by my invention, and should the riddle choke on account of wet grain, the feeder can readily reach forward to the balance-lever, and hold the wind on until the riddle clears itself without calling for assistance.

Having thus explained my invention, what I claim as new, and desire to secure by Letters Patent, is—

The governor F, in combination with the balance-lever E, provided with the rigid arms D and the gates C, substantially as and for the purpose set forth.

HENRY SMITH STONE.

Witnesses:
L. H. DOUGLAS,
J. M. WALKER.